United States Patent [19]

Ito et al.

[11] Patent Number: 4,664,481
[45] Date of Patent: May 12, 1987

[54] LIQUID CRYSTAL DISPLAY DEVICE HAVING FLUORESCENT TUBE ILLUMINATOR

[75] Inventors: Hiroshi Ito, Katsuta; Masaru Kugo, Ogawa, both of Japan

[73] Assignees: Hitachi, Ltd., Tokyo; Hitachi Automotive Engineering Co., Ltd., Ibaraki, both of Japan

[21] Appl. No.: 894,046

[22] Filed: Aug. 7, 1986

[30] Foreign Application Priority Data

Aug. 9, 1985 [JP] Japan .................. 60-174160

[51] Int. Cl.$^4$ .................................................. G02F 1/13
[52] U.S. Cl. .................. 350/345; 350/339 R
[58] Field of Search .................................... 350/345

[56] References Cited

U.S. PATENT DOCUMENTS 4,618,216  10/1986  Suzawa ........................ 350/345

FOREIGN PATENT DOCUMENTS 59-155829  9/1984  Japan .

Primary Examiner—John K. Corbin
Assistant Examiner—Richard F. Gallivan
Attorney, Agent, or Firm—Antonelli, Terry & Wands

[57] ABSTRACT

A reflecting plate is disposed in such a manner as to surround a fluorescent tube in a U shape in its axial direction. A light diffusion-transmission plate is disposed in such a manner as to bridge over the open end portions of the U-shaped reflecting plate and to extend in the axial direction of the fluorescent tube. A liquid crystal display element is disposed on this light diffusion-transmission plate. In the liquid crystal display device having the construction described above, the present invention disposes shading means for increasing the quantity of light near the filament portions and limiting the quantity of light on the light emission surface inside the fluorescent tube.

5 Claims, 8 Drawing Figures

LIQUID CRYSTAL DISPLAY DEVICE HAVING FLUORESCENT TUBE ILLUMINATOR

FIELD OF THE INVENTION

This invention relates to an improvement in a light source of a liquid crystal display device, and more particularly to a liquid crystal display device which can be used suitably for a vehicle, or the like.

BACKGROUND OF THE INVENTION

One example of conventional liquid crystal device has a construction in which a U-shaped reflecting plate is disposed in such a manner as to surround a fluorescent tube in a U shape and liquid crystal display element is disposed on a light diffuse-transmission plate that bridges over the open enexample, in Japanese Patent Laid-Open No. 155829/1984 entitled "Transmission Type Liquid Crystal Display Device" laid-open to public on Sept. 5, 1984.

However, if the light emission surface of the fluorescent tube itself is divided into a central portion and both end portions, the quantity of light (luminance) at both end portions is lower than that at the central portion. Accordingly, when the liquid crystal display device is arranged on an instrument panel of a car, for example, a fitting surface or the arrangement of the fluorescent tube must be examined carefully in order to prevent non-uniform illumination and to have the illumination averaged. Although the arrangement wherein a shade curtain is disposed between the light emission surface and illumination surface of the fluorescent tube to make uniform the light on the illumination surface has been put into practical application such as in billboards, this method involves the problem that the luminance at a low luminance portion can not be increased.

On the other hand, Japanese Patent Laid-Open No. 198850/1983 entitled "Light Source Using Mesh Heater", laid-open on Nov. 18, 1983 disposes a cylindrical mesh heater around the fluorescent tube in such a manner as to cover its light emission surface in order to ensure lighting of the fluorescent lamp even at a low temperature of below 0° C. However, this mesh heater structure involves the problem that the luminance is not uniform in the longitudinal direction of the fluorescent lamp because the mesh is not a uniform grid.

SUMMARY OF THE INVENTION

It is a primary object of the present invention to provide a liquid crystal display device having uniform luminance.

When a fluorescent lamp is used as a light source, it cannot be used effectively as an illumination because its luminance is lower at both end portions of its light emission surface (filament portion) than at its central portion. Accordingly, the present invention disposed shading means for returning a suitable quantity of light on the light emission surface into the fluorescent tube in order to restrict excessive luminance and at the same time, to extract a greater quantity of light from the vicinity of both end portions by the quantity of light that is returned into the tube. Thus, the fluorescent tube according to the invention can provide excellent luminance at both end portions of the tube.

DESCRIPTION OF THE PREFERRED EMBODIMENTS

Figure 1A:
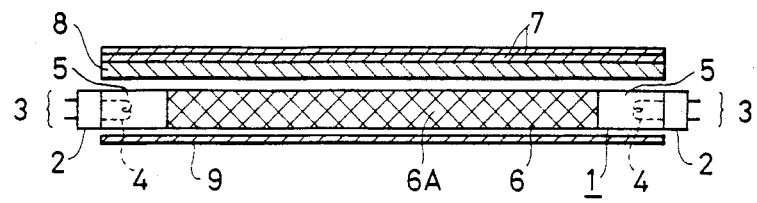
FIG. 1A is a partial longitudinal sectional view of part of a liquid crystal display device in accordance with the present invention in an axial direction of a fluorescent tube.
Figure 1B:
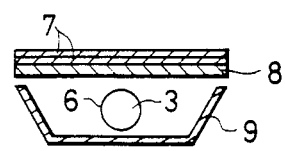
FIG. 1B is a transverse sectional view of the liquid crystal display device in a direction crossing at right angles the axial direction of the fluorescent tube.

Referring initially to FIG. 1, there is shown a fluorescent tube 1 having an ordinary structure wherein a fluorescent material is coated inside the tube and an Ar gas and Hg vapor are sealed therein. Metal members 2 are hermetically fixed to both end portions of the fluorescent tube 1, and a filament 4 connected electrically to a lead electrode 3 is placed in the tube at each end portion.

On the other hand, shading means such as a shade curtain 6A is disposed on a light emission surface 5 between the filaments in order to increase the quantity of light near and around both end portions of the tube but to limit quantity of light at the central portion of the light emission surface.

Reference numeral 7 represents a liquid crystal display element, 8 is a light diffusion-transmission plate and 9 is a reflecting plate.

Figure 2A:
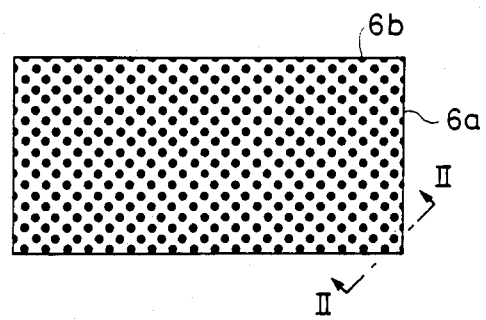
FIG. 2A is an exploded view of a shade curtain shown in FIGS. 1A and 1B.
Figure 2B:
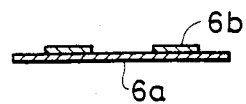
FIG. 2B is a sectional view taken along line II—II of FIG. 2A.

The shade curtain 6A described above will be explained in detail with reference to FIG. 2. The shade curtain 6A is formed by depositing in a mesh form an aluminum foil 6b or the like having high reflection factor on the surface of a transparent polyester film, for example, by vacuum deposition or like means. In the first embodiment of the invention, a plurality of aluminum foils having a uniform size are disposed equidistantly. The shade curtain 6A formed in this manner is wound, bonded and fixed to the light emission surface 6 of the fluorescent tube 1.

Figure 3A:
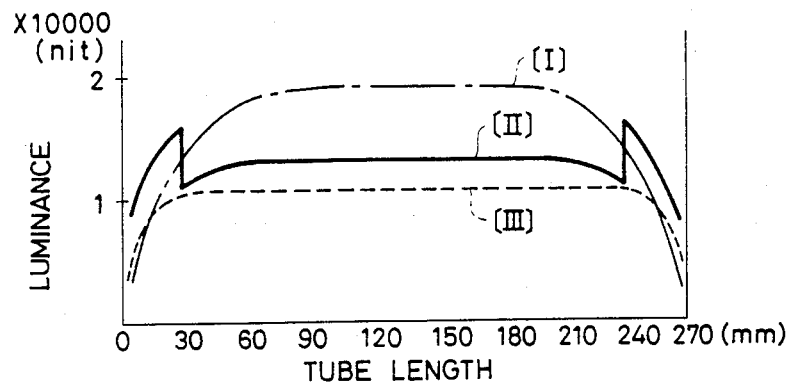
FIG. 3A is a diagram showing the luminance characteristics of the longitudinal direction of the fluorescent tube and corresponding to FIG. 3B.
Figure 3B:
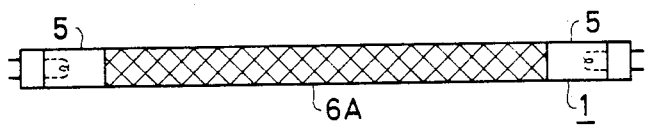
FIG. 3B is a front view of the fluorescent tube to which one embodiment of the invention is applied.

When a voltage is applied to the filament 4 through the lead electrode 3, ultraviolet rays generated by the discharge from the filament is converted to visible light rays for illumination. As shown in the diagram of FIG. 3A-[I], the light quantity curve of the prior art tubes is high at the central portion of the light emission surface but is low at both end portions. In contrast, in the fluorescent tube of the present invention, part of the quantity of light is returned into the fluorescent tube by the shade curtain 6A disposed on the light emission surface, repeats reflection inside the tube, shifts the unnecessary high quantity of light towards both end portions of the tube and emit the light from discharge portions 5 near both end portions (FIG. 3A-[II]).

Generally, the luminance rise ratio at both end portions of the fluorescent tube is determined by a shading degree on the light emission surface, but can be set arbitrarily as required. Suppose the shade curtain 6A is spaced apart from the fluorescent tube 1 and is positioned around its outer peripheral portion, the reflecting effect of the shade curtain cannot be expected, and the luminance rise at both end portions of the fluorescent tube cannot be expected as shown in FIG. 3A-[III] so that the luminance drops as a whole.

In accordance with the embodiment described above, it becomes possible to increase luminance at both end portions of the fluorescent tube, where the quantity of light is generally low, and to restrict the portion having a great quantity of light by simply winding the shade curtain having the reflection function round the light emission surface of the fluorescent tube 1. Accordingly, the quantity of light which is averaged as a whole and is devoid of non-uniformity can be obtained and such a uniform range can be expanded by about 10 to 20 mm at both end portions of the fluorescent tube, so that an easy-to-view device for use in an instrument panel or the like can be obtained readily and simply.

Next, the second embodiment of the present invention will be described with reference to FIG. 4. The shade curtain fixed to the light emission surface of the fluorescent tube 1 has a structure such that the aluminum foils bonded to the surface of the polyester film are arranged to be progressively coarsely from the central portion towards both discharge portions, or in other words, the transmission factor becomes progressively higher with a progressively descreasing reflection factor. This structure can be obtained easily by arranging aluminum foils equidistantly on the surface of a polyester film, the foils of small areas at the central portion and the foils of progressively smaller areas toward both end portions of the film.

Figure 4A:
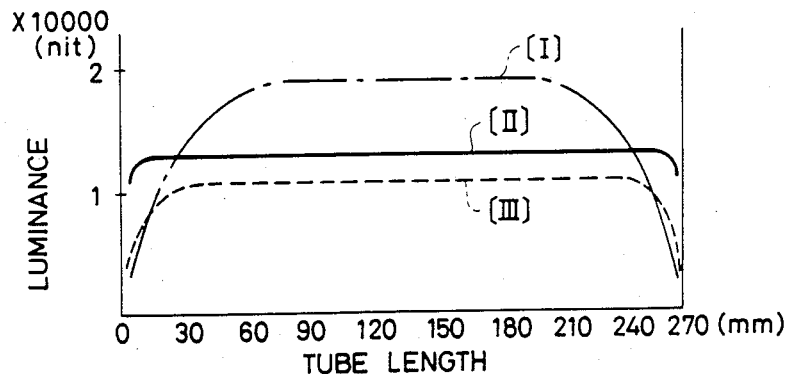
FIG. 4A is a diagram showing the luminance characteristics of the fluorescent tube in the longitudinal direction and corresponding to FIG. 4B.
Figure 4B:
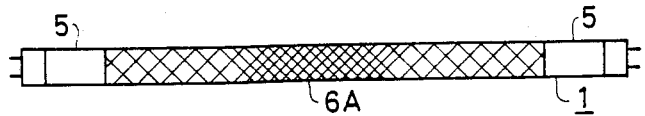
FIG. 4B is a front view of the fluorescent tube in accordance with another embodiment of the present invention.

According to this structure, the quantity of light is cut off suitably at the central portion of the fluorescent tube where the quantity of light is relatively great, and the transmission factor is increased progressively from the central portion towards both end portions, so that luminance becomes substantially uniform from the center to the discharge portions as shown in FIG. 4A-[II], and distribution of the quantity of light becomes more excellent.

Incidentally, both the two embodiments described above illustrate examples where the aluminum foils 6b are bonded to the upper surface of the polyester film 6a, but the same effect can be obtained similarly by punching the aluminum foil 6b to bore holes, and the bores may have arbitrary shapes and sizes in accordance with required characteristics.

Additionally, the shade curtain need not particularly be produced separately and bonded to the fluorescent tube, but can be formed simultaneously with shaping of the tube. The material used in the embodiments described above is not limitative, in particular, and any other material can also be used so long as they have the same function.

The fluorescent lamp illumination device thus obtained can restrict the luminance at the central portion of the tube where unnecessarily high luminance is obtained, and can increase the luminance of the tube surface at both end portions where luminance is otherwise low. Incidentally, the luminance at both end portions can be increased in accordance with the degree of shading at the central portion. Accordingly, the fluorescent tube itself can emit light more uniformly as a light source, and since the range which can be used effecgively as the light source can be expanded by about 10 to 20 mm at both end portions, the effective display range of the display device with respect to the length of the fluorescent tube can be increased, and the size of the display device with respect to the display range can be reduced, on the contrary.

As described above, the present invention can provide a liquid crystal display device having a constant quantity of light.

What is claimed is:

1. In a liquid crystal display device consisting essentially of:
   a fluorescent tube having a fluorescent material coated therein and an inert gas and a mercury vapor sealed therein and emitting light by discharge;
   a reflecting plate dispoeed in such a manner as to surround said fluorescent tube in a U shape in an axial direction of said fluorescent tube;
   a light diffusion-transmission plate disposed in such a manner as to bridge over the open end portion of said U-shaped reflecting plate and extend in the axial direction of said fluorescent tube; and
   a liquid crystal element disposed on said light diffusion-transmission plate;
the improvement wherein shading means for increasing the quantity of light near filament portions and restricting the quantity of light of the light emission surface is disposed on said fluorescent tube.

2. The liquid crystal display device as defined in claim 1 wherein said shading means consists of a shade curtain disposed on the light emission surface of said fluorescent tube other than its filament portions and having a reflection function and a transmission function.

3. The liquid crystal display device as defined in claim 2 wherein said shade curtain is fixed tightly to the outer periphery of the light emission surface.

4. The liquid crystal display device as defined in claim 2 wherein said shade curtain is formed coarsely in such a fashion that the light transmission quantity becomes progressively greater towards both end portions of said fluorescent tube.

5. The liquid crystal display device as defined in claim 2 wherein said shade curtain is produced by vacuum-depositing reflecting members in a mesh or dot form on a light transmission film.

* * * * *